United States Patent [19]
Sobottka et al.

[11] Patent Number: 6,066,691
[45] Date of Patent: May 23, 2000

[54] ANTI-BLOCKING AGENT AND PROCESS FOR ITS MANUFACTURE

[75] Inventors: Richard Sobottka, Worms; Georg Lüers, Westhofen; Andreas Schmidt, Mannheim, all of Germany

[73] Assignee: Grace GmbH, Worms, Germany

[21] Appl. No.: 09/128,691

[22] Filed: Aug. 4, 1998

Related U.S. Application Data

[62] Division of application No. 08/470,162, Jun. 6, 1995, Pat. No. 5,792,808.

[30] Foreign Application Priority Data

Jul. 5, 1994 [DE] Germany .............................. 44 24 775

[51] Int. Cl.$^7$ ....................................................... C08J 5/16
[52] U.S. Cl. .......................... 524/450; 524/442; 524/232; 524/493; 502/60; 502/77
[58] Field of Search ..................................... 524/450, 493, 524/442, 232; 502/66, 77

[56] References Cited

U.S. PATENT DOCUMENTS

| | | | |
|---|---|---|---|
| 3,644,130 | 2/1972 | Evans et al. .............................. | 106/270 |
| 4,675,122 | 6/1987 | Luers et al. .............................. | 524/232 |
| 4,785,042 | 11/1988 | Azuma et al. ........................... | 524/444 |
| 4,888,378 | 12/1989 | Kostinko ................................... | 524/450 |
| 4,970,279 | 11/1990 | Bailly et al. .............................. | 526/63 |
| 5,308,648 | 5/1994 | Prince et al. ............................. | 427/212 |
| 5,322,821 | 6/1994 | Brezny ...................................... | 501/80 |
| 5,366,645 | 11/1994 | Sobottka ................................... | 252/28 |
| 5,403,570 | 4/1995 | Chevallier ................................. | 423/339 |
| 5,538,710 | 7/1996 | Guo et al. ................................. | 502/60 |
| 5,573,990 | 11/1996 | Wang et al. .............................. | 502/77 |
| 5,609,679 | 3/1997 | Luer et al. ............................... | 508/136 |

FOREIGN PATENT DOCUMENTS

| | | |
|---|---|---|
| 0526117 | 2/1993 | European Pat. Off. . |
| 61-10154 | 5/1986 | Japan . |

*Primary Examiner*—David W. Wu
*Assistant Examiner*—Ling-Siu Choi
*Attorney, Agent, or Firm*—Charles A. Cross

[57] ABSTRACT

An anti-blocking agent comprising silicon dioxide or mixtures of silicon dioxide and zeolite is described, which is characterized in that it has a bimodal pore size distribution, the first maximum of the bimodal pore size distribution being in the pore size range <5 nm and the second maximum of the bimodal pore size distribution in the pore size range >6 nm. The anti-blocking agent is obtainable by micronizing a mixture comprising silicon dioxide of a certain pore size and silicon dioxide and/or zeolite having a different pore size. It can be produced together with lubricating agent as a combined anti-blocking and lubricating agent. Incorporation of the anti-blocking agent or of the combined anti-blocking agent and lubricating agent into a polymer in the form of a master batch is preferable. In addition to a better dispersion and distribution of the anti-blocking agent particles in films and the improved optical properties associated therewith, the particular advantage of the anti-blocking agent according to the invention is that the adsorption of lubricating agent is avoided or greatly reduced, so that less lubricating agent can be used than in the prior art.

13 Claims, 7 Drawing Sheets

ANTI-BLOCKING AGENT AND PROCESS FOR ITS MANUFACTURE

This is a division of application Ser. No. 08/470,162, filed Jun. 6, 1995 U.S. Pat. No. 5,792,808.

The invention relates to an anti-blocking agent comprising silicon dioxide or mixtures of silicon dioxide and zeolite and to a process for its manufacture.

Micronized silicic acid gels and molecular sieves (zeolites) are used to a great extent as anti-blocking agents in polymer films. Synthetic amorphous silica gels have a relatively large specific pore volume (usually called porosity) and accordingly deliver a larger number of particles (of a certain size) per gram than products with lower porosity (e.g. talc, chalk, natural silica gels such as diatomaceous earth). If these particles, which generally have diameters between 1 and 10 $\mu$m (Coulter Counter), are incorporated into polymer films in concentrations of the order of 0.1%, they produce microscopic surface deformations which prevent the complete contact of films lying on one another and facilitate separation of the films from one another (for example in the case of shopping bags) or the unwinding of film rolls. This is the "anti-blocking" effect. For the above reasons, micronized synthetic silica gels are more effective anti-blocking agents than products with low or no porosity.

In many cases, a lubricating agent is added to polymer films in addition to the anti-blocking agent. The lubricating agent is in most cases a fatty acid amide such as oleic acid amide or erucic acid and facilitates the sliding of the films over one another (sliding effect). The present anti-blocking agent reduces the effectiveness of the lubricating agent however, because the latter is adsorbed on the surface of the anti-blocking agent. As a result, some of the lubricating agent is not available on the film surface, where it is required for the desired sliding effect. Natural products have a very small surface of 0.1 to 0.5 $m^2/g$ compared with synthetic $SiO_2$ products having a surface of 300 to 600 $m^2/g$. They adsorb less lubricating agent than for example silica gel, but have only a very small anti-blocking action as a result of the low porosity.

The anti-blocking action of synthetic silica gels is almost three times greater than that of products with a small surface, but unfortunately, synthetic silica gels adsorb lubricating agents. This means that a polyolefin film has for example to be provided with 0.3 wt. % of an anti-blocking agent having a small surface and 0.1 wt. % lubricating agent or with 0.1 wt. % anti-blocking agent comprising synthetic silicic acid and 0.15 wt. % lubricating agent in order to obtain the desired anti-blocking and sliding properties. This shows that the effectiveness of the lubricating agent is considerably reduced in the presence of synthetic silicic acid, i.e. approximately 50% more lubricating agent is required in order to obtain the same sliding effect or the same low friction coefficient.

Thus, although the traditional synthetic silicic acids are highly effective anti-blocking agents, the adsorption of lubricating agent is a problem, because
a) it makes it difficult to predict the ultimately obtainable effect of the lubricating agent in the film,
b) the higher quantity of lubricating agent increases the costs of film manufacture and
c) the required higher quantity of lubricating agent increases the extractable quantity of organic constituents, which is of importance as regards approval of the film for the packaging of foods.

According to EP-A-0 526 117 it is reportedly possible to offset the reduced lubricating agent effect by adding alkylene polyethers as "slip boosting agent", so that smaller quantities of lubricating agent suffice for the desired lubricant effect. However, this procedure has the disadvantage that other organic constituents must be added.

Compared with this, it is the object of the invention to provide an anti-blocking agent having a high anti-blocking action which avoids or greatly reduces the aforementioned disadvantages of the prior art as regards adsorption of lubricating agent, which can be dispersed in excellent manner in the polymer film material and thereby leads to clearer films (fewer flecks), treatment with an additive such as according to EP-A-0 526 117 not being necessary, the desired properties being achieved through optimum setting of the physical properties (pore volume, pore size and surface).

To achieve this object, an anti-blocking agent comprising silicon dioxide or mixtures of silicon dioxide and zeolite is proposed, which is characterized in that it has a bimodal pore size distribution.

A process for the manufacture of the anti-blocking agent according to the invention is also a subject of the invention, which is characterized in that a mixture of silicon dioxide of a certain pore size and silicon dioxide and/or zeolite with a different pore size is micronized.

It was surprisingly found that when a mixture of two anti-blocking agents having different pore sizes is used, an anti-blocking agent is obtained whose overall properties are very much better than those of the two mixture constituents. It is particularly surprising that the anti-blocking effectiveness of the mixture does not decrease in accordance with the reduced average pore volume of the mixture. Rather, the anti-blocking effectiveness of the mixture is almost exactly as good as the traditional silicic acid anti-blocking agent having a pore volume of 0.9 to 1.2 ml/g. It was also unexpected that the particles of the mixture can be dispersed and distributed better in the films than is the case with traditional silicic acid anti-blocking agents. This again leads to considerably improved optical properties of the films, since the number of agglomerates in the films is lower. In some cases, a lower expenditure on energy is sufficient when using the anti-blocking agents according to the invention to obtain a film of the same optical quality, compared with using traditional silica gel anti-blocking agents (i.e. having monomodal pore size distribution).

The pore size distribution (to be more exact: pore diameter distribution) is represented by the distribution density curve:

pore volume density=f (pore diameter)

The pore volume density p(x) is obtained from:

$p(x)=dP(x)/dx$,

P being the specific pore volume, p the pore volume density and x the pore diameter. The pore size distribution is determined according to ASTM D 4641-88 using the automatic analysis device ASAP 2400 from Messrs. Micromeritics. As silicon dioxide has a hysteresis in the nitrogen isotherm, the adsorption curve is used. The integrated pore volume (up to 600 Å pore diameter) is the specific pore volume. The specific surface is measured with the same device by gas adsorption according to Brunauer, Emmett and Teller (BET) by multi-point measurement within the scope of the pore size distribution determination. Measurement is carried out according to DIN 66131.

Figure 3:
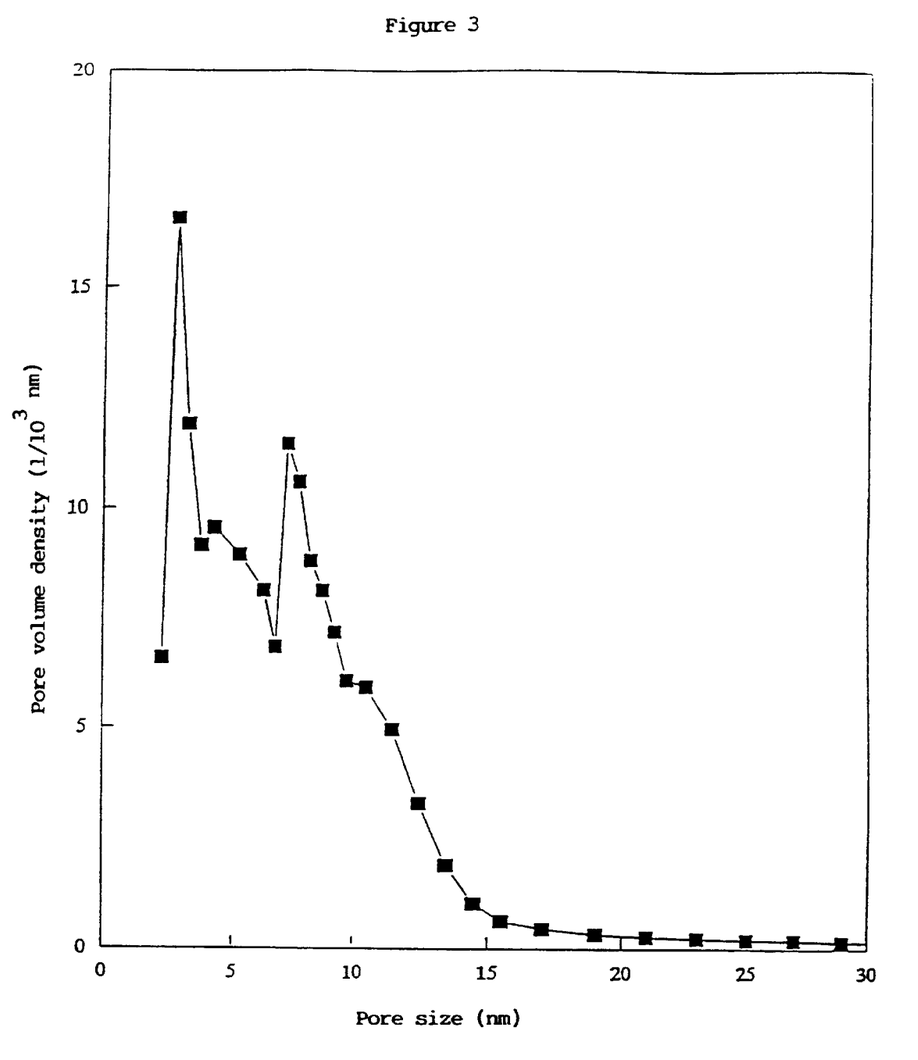
FIG. 3 is a plot of the pore size distribution for an antiblocking agent of the invention.

A bimodal pore size distribution has two maxima (peaks) (see e.g. FIG. 3). The bimodality of the pore size distribution of the anti-blocking agent according to the invention can be determined in two ways, namely from the pore diameter distribution of the end-product according to the invention (as in FIG. 3) or by calculating the average pore diameter of the mixture components from the corresponding pore volumes and the corresponding surfaces according to Wheeler (A. Wheeler in P. H. Emmet (Editor), Catalysis, Vol. 2, Reinhold, N.Y., 1955, page 116).

In the case of the bimodal pore size distribution of the anti-blocking agent according to the invention, the first maximum is located in the pore size range <5 nm. The second maximum is located in the pore size distribution range >6 nm.

In the range of silica gels obtainable commercially, the following generally applies: gels having a smaller specific pore volume have a low pore size and a large specific surface, whilst gels with large specific pore volumes have a large pore size and a relatively small specific surface. This can be demonstrated with reference to the following examples:

| Trade name | Specific pore volume, ml/g | Average pore size (Wheeler), nm | Specific surface, $m^2/g$ |
| --- | --- | --- | --- |
| SYLOID AL-1 | 0.4 | 2.3 | 700 |
| SYLOBLOC 47 | 1.1 | 9.2 | 480 |

Figure 1:
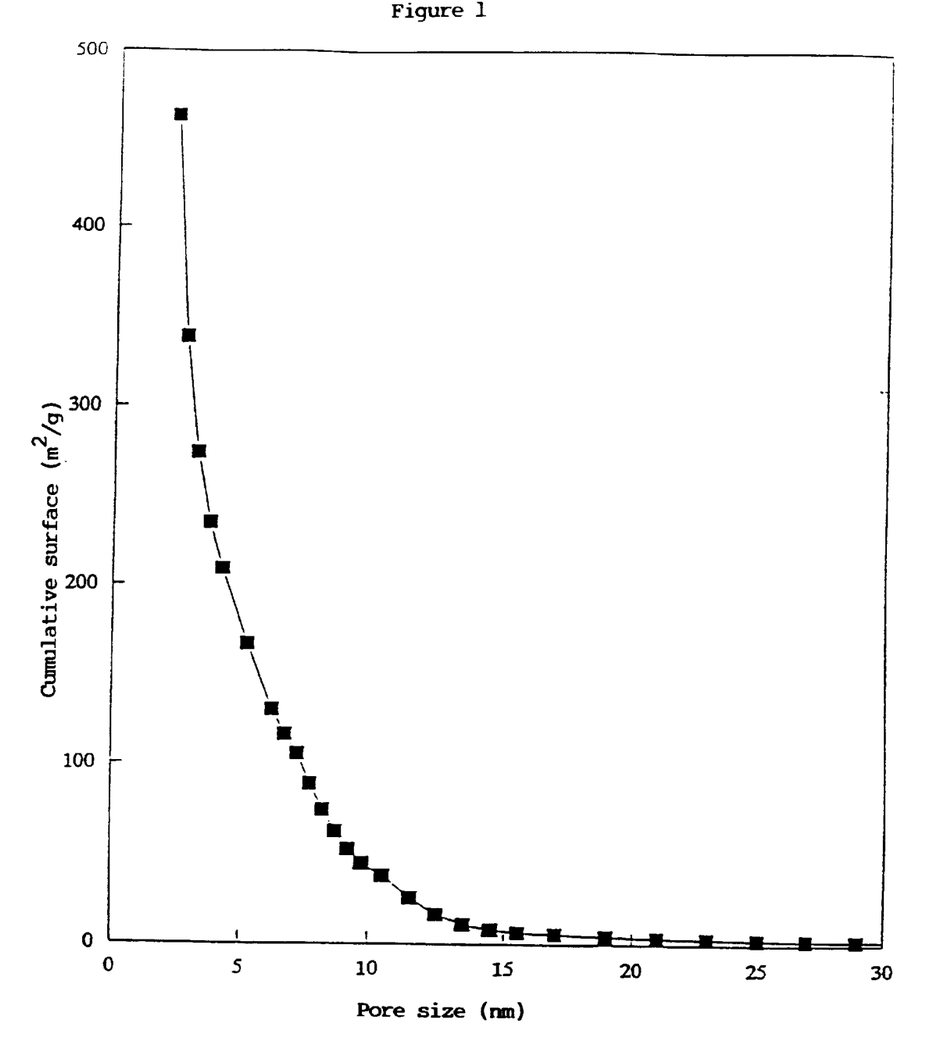
FIG. 1 is a plot of surface area vs. minimum pore size for an antiblocking agent of the invention.
Figure 2:
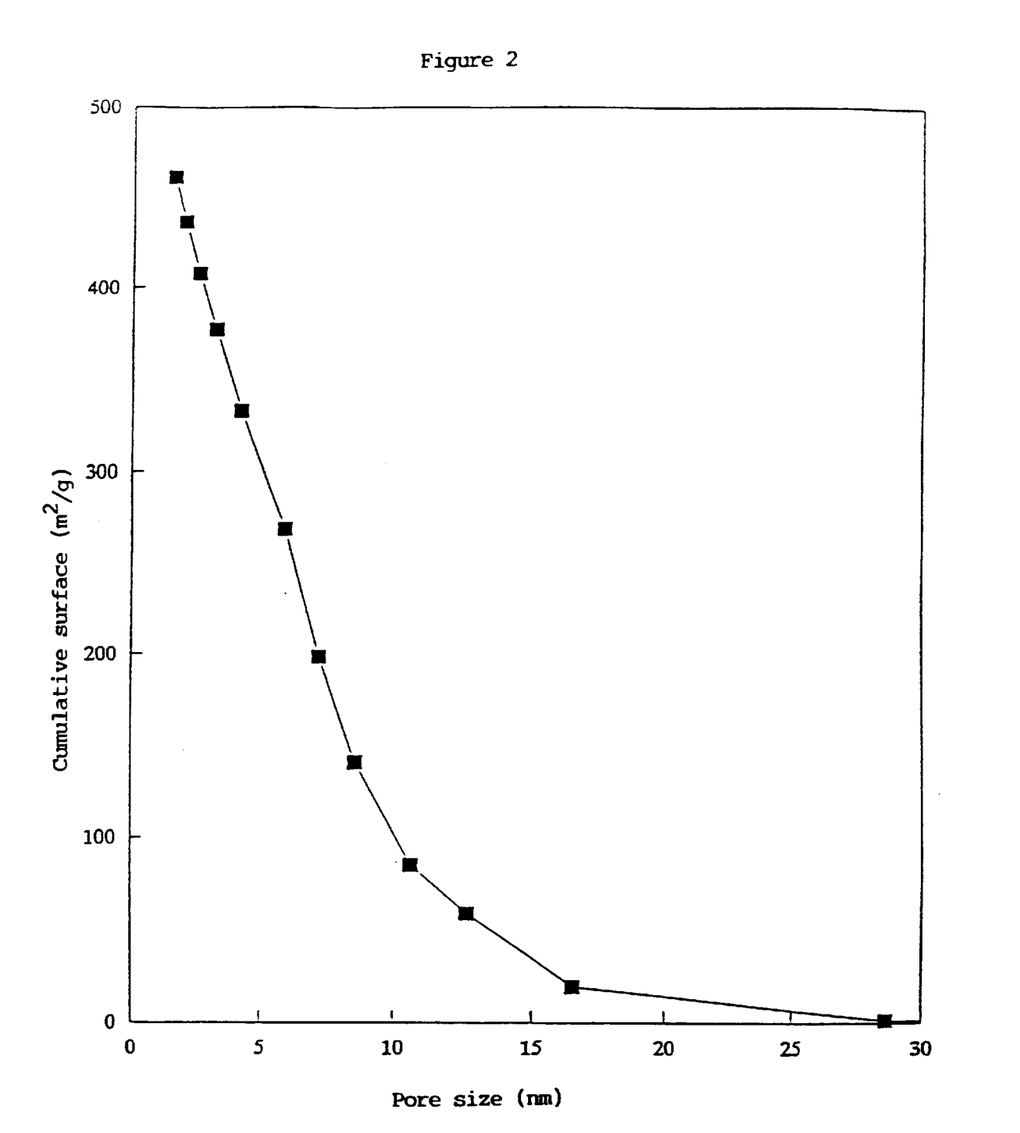
FIG. 2 is a plot of surface area vs. minimum pore size for prior art antiblocking agent.

The anti-blocking agent according to the invention represents a new type of anti-blocking agent with optimized properties. For this, it necessary that a relatively large proportion of the surface is located in pores which are so small that the additive molecules (e.g. fatty acid amides) are not able to enter, and that the overall porosity is nevertheless large enough to ensure a satisfactory anti-blocking effectiveness. According to the invention, an anti-blocking agent having large pores (e.g. average 9.2 nm) is accordingly combined with an anti-blocking agent having small pores (e.g. average 2.3 nm). The anti-blocking agent with the large pores delivers an adequate pore volume for the anti-blocking effectiveness. The majority of the surface is however to be found in the pores of the anti-blocking agent having small pores, with the result that the additive molecules cannot be adsorbed. FIGS. 1 and 2 show for example that the surface available in pores having a diameter of more than 10 nm is approximately 100 $m^2/g$ for a standard anti-blocking agent and only 40 $m^2/g$ for the anti-blocking agent according to the invention (silica gel).

The anti-blocking agent according to the invention delivers a considerably improved dispersibility and very clear polymer films. The anti-blocking effectiveness is practically the same as with traditional silica gels, but the adsorption of fatty acid amides is considerably reduced compared with traditional silica gels.

Traditional $SiO_2$ anti-blocking agents are micronized $SiO_2$ compositions with a pore volume of 0.9 to 1.2 ml/g. Products with a higher pore volume are difficult to disperse if standard incorporation devices are used. They are therefore not used in practice. Products with a smaller pore volume are better in terms of dispersibility, but show a clearly lower anti-blocking effectiveness. The anti-blocking agent according to the invention is advantageously produced from two anti-blocking agents in a mixture ratio of 2:8 to 8:2, whereby the two mixture components have different pore volumes. The pore volume of one anti-blocking agent should be 0.9 to 1.9 ml/g and that of the other 0.3 to 0.6 ml/g. The corresponding surfaces usually lie in the range from 250 to 500 $m^2/g$ and 500 to 900 $m^2/g$ respectively, so that the average pore diameters are 7.2 to 30.4 nm and 1.3 to 4.8 nm respectively. The two anti-blocking agents are preferably micronized together in a jet mill to an average particle size of 1 to 10 $\mu$m (Coulter Counter). The pore size distribution of the product obtained is bimodal, the surface is approximately 600 $m^2/g$ and the pore volume approximately 0.6 ml/g (see Example 1).

Figure 4:
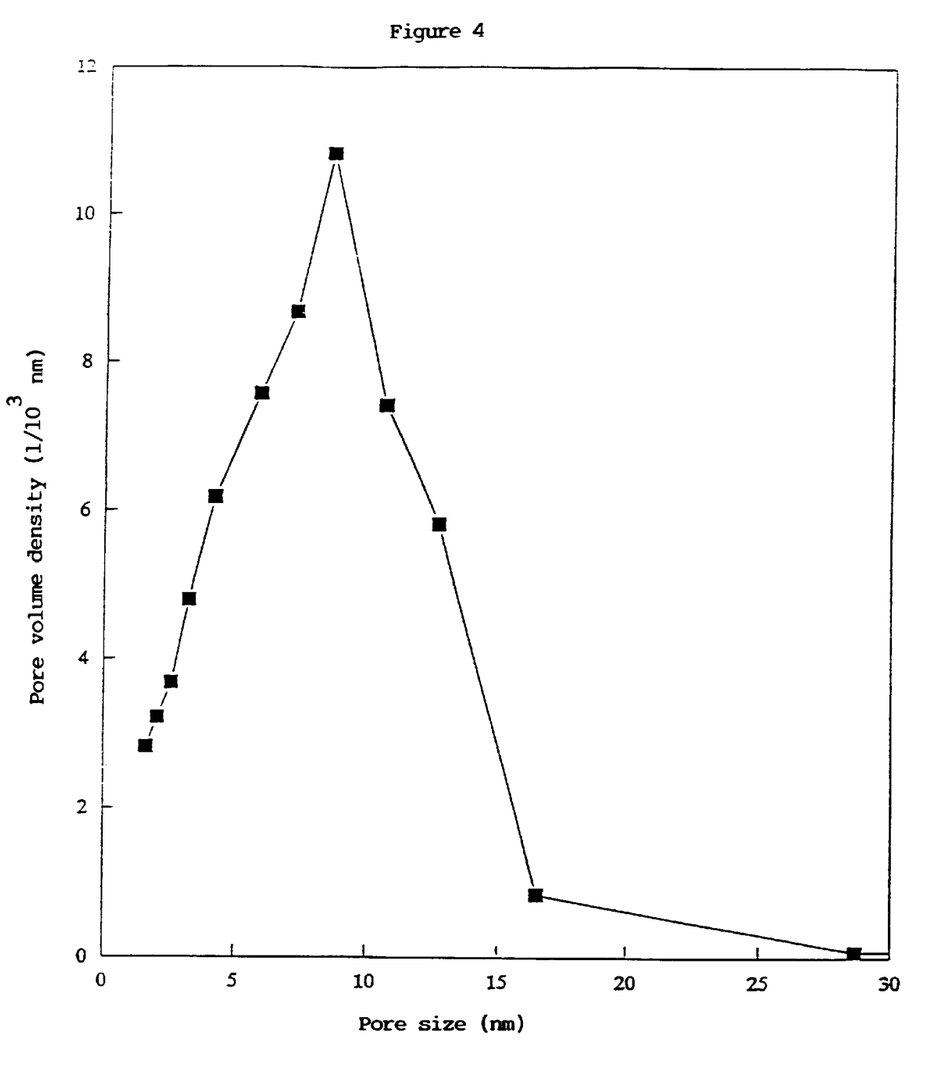
FIG. 4 is a plot of the pore size distribution for a prior art antiblocking agent.

The pore size distributions of an anti-blocking agent according to the invention (silica gel) and of a traditional anti-blocking agent (silica gel) are shown in FIGS. 3 and 4 respectively.

Anti-blocking agents suitable according to the invention are micronized silica gels and precipitated silicic acids and zeolites. The latter are suitable as a component with a smaller pore diameter, for example 0.3, 0.4, 0.5 or 1 nm. Examples are sodium zeolites A, X and Y, partially or completely substituted with K or Ca. The polymer films in which the anti-blocking agent according to the invention is used preferably consist of polyethylene, polypropylene or linear polyester.

The anti-blocking agents according to the invention can be combined with lubricating agents for processing in polymer films, so that combined anti-blocking and lubricating agents are produced. Suitable as lubricating agents are amides of unsaturated $C_{18}$–$C_{22}$ fatty acids and in particular oleic acid amide and erucic acid amide. Accordingly, the combined anti-blocking and lubricating agents advantageously consist of 20 to 80 wt. % of one or more amides of unsaturated $C_{18}$–$C_{22}$ fatty acids and 80 to 20 wt. % of the bimodal anti-blocking agent according to the invention.

In another use form, which is particularly suitable in practice, the anti-blocking agent according to the invention or the combined anti-blocking and lubricating agent exists in the form of a master batch, i.e. it is incorporated already in a relatively high concentration into a polymer, in particular a polyolefin. The polymer is preferably the same polymer as that which also constitutes the film into which the anti-blocking agent or the combined anti-blocking and lubricating agent is to be incorporated. The concentration of the anti-blocking agent or the combined anti-blocking and lubricant agent in the master batch is generally 10 to 50 wt. %.

EXAMPLE 1

A silica gel with a pore volume of 0.46 ml/g (measured by nitrogen adsorption) and a BET surface of 802 m$^2$/g (average pore size 2.3 nm) and a silica gel with a pore volume of 0.93 ml/g and a BET surface of 529 m$^2$/g (average pore size 7.0 nm) were fed into a steam jet mill in a weight ratio of 50/50. A grinding pressure of 6 bar at a temperature of the superheated steam of 290° C. led to the desired particle size of 4 μm (Coulter Counter). The particle size distribution agreed with that of a micronized silica gel which had been prepared from only one of the two silica gels. The resulting pore volume was 0.62 ml/g and the resulting surface 610 m$^2$/g. The pore size distribution was bimodal as shown in FIG. 3. As comparison, the pore size distribution of a silica gel having a pore volume of 0.93 ml/g (SYLOBLOC 45) is reproduced in FIG. 4.

EXAMPLE 2

Using an internal mixer, 0.2 wt. % silica gel and 0.2 wt. % oleic acid amide were incorporated into polyethylene (LD-PE) having a density of 0.924 g/cm$^3$ and a melt index of 1.5 g/10 min (190° C/2.16). As comparison, a sample was prepared which contained only 0.2 wt. % oleic acid amide.

Films with a film thickness of 1 mm were extruded from these materials in a laboratory extruder. The extrusion temperatures were 180° C. (cylinder) and 190° C. (die). The die had a width of 10 cm.

The dynamic friction coefficient of the extruded films was measured 1, 4 and 6 days after extrusion. Measurements were carried out with a device from the Davenport Company (Davenport Friction Tester) according to BS 2782 Method 311 A.

Figure 5:
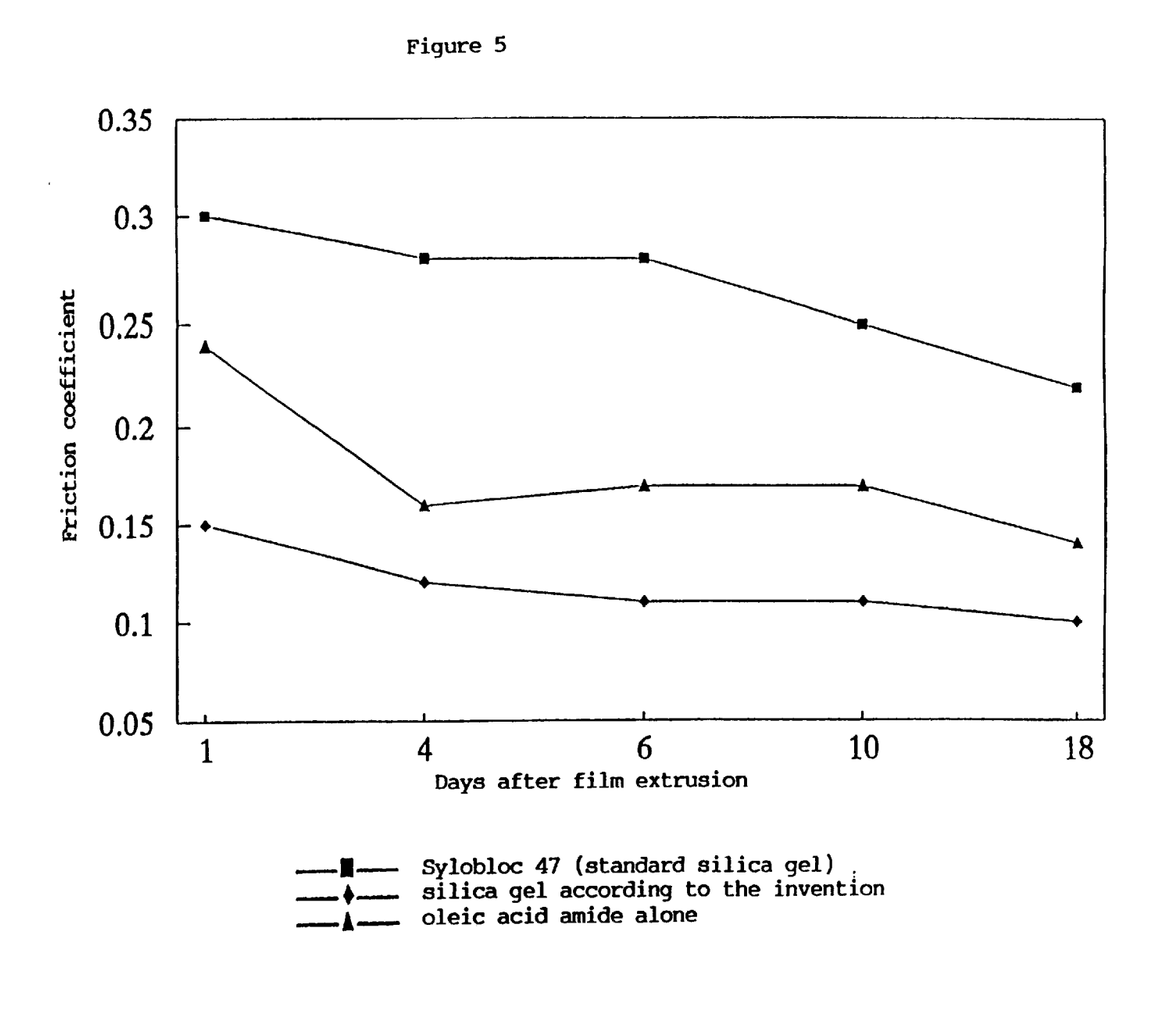
FIG. 5 is a comparison of coefficient of friction vs. time after film extrusion for film containing the antiblocking agent of the invention and films containing prior art antiblocking agent or no antiblocking agent.

FIG. 5 shows that the sample containing the traditional silica gel SYLOBLOC 47 (pore volume 1.1 ml/g) and oleic acid amide has a higher friction coefficient than the samples containing a) only oleic acid amide and b) the silica gel according to the invention and oleic acid amide.

The silica gel prepared according to Example 1 had a pore volume of 0.62 ml/g and absorbed very much less oleic acid amide than silica gels having a larger pore volume. The silica gel particles lead to a micro-rough film surface and the friction coefficient of the samples containing the silica gel according to the invention and oleic acid amide is accordingly lower than that of the sample which contains only oleic acid (a sample of this type has a flat surface because no silica gel particles are present).

EXAMPLE 3

The dispersibility of the silica gel according to the invention was investigated several times. As comparison, a SYLOBLOC 45 standard silica gel anti-blocking agent and a SYLOBLOC silica gel having monomodal pore size distribution (pore volume 0.7 ml/g) were investigated.

a) The silica gels were mixed dry with polypropylene pellets (Novolen 1300, BASF). The quantities of silica gel were 0.2 and 0.5 wt. %. Flat polypropylene films were extruded from these mixtures (film thickness 50 μm). It should be pointed out that the extruder did not have a filter of any kind.

In the case of all films, the flecks (agglomerates) measuring more than 0.4 mm were counted. The area investigated was 0.012 m$^2$. Whilst the number of flecks on using 0.5 wt. % of the silica gel according to the invention (Example 1) was 40, the samples with 0.5 wt. % SYLOBLOC 45 standard silica gel and silica gel with monomodal pore size distribution had more than 100 flecks.

b) The silica gels were incorporated into polypropylene using a twin-screw extruder in order to produce a master batch which contained 5 wt. % silica gel and 95 wt. % polypropylene. The master batch was then mixed with pure polypropylene pellets in order to establish an end concentration of 0.5 wt. % silica gel. Film extrusion and counting of the flecks was carried out as described under a).

The film containing the silica gel according to the invention had noticeably fewer flecks than films containing the other silica gels.

EXAMPLE 4

Different quantities of silica gel were incorporated into polyethylene (LD-PE) having a density of 0.924 g/cm$^3$ (500, 1000 and 2000 ppm). Films having a thickness of 40 μm were produced. The extrusion conditions comprised a temperature of 160° to 170° C. (cylinder), 180° C. (die) and output of 10 kg/h.

The thus-obtained blown films were blocked artificially. For this, film samples measuring 10×7 cm$^2$ were placed in an oven at 60° C. for 3 hours. The films were exposed to a loading of 0.3 N/cm$^2$. After the film blocking, the force required to separate two films was determined using a Davenport Film Blocking Tester.

Figure 6:
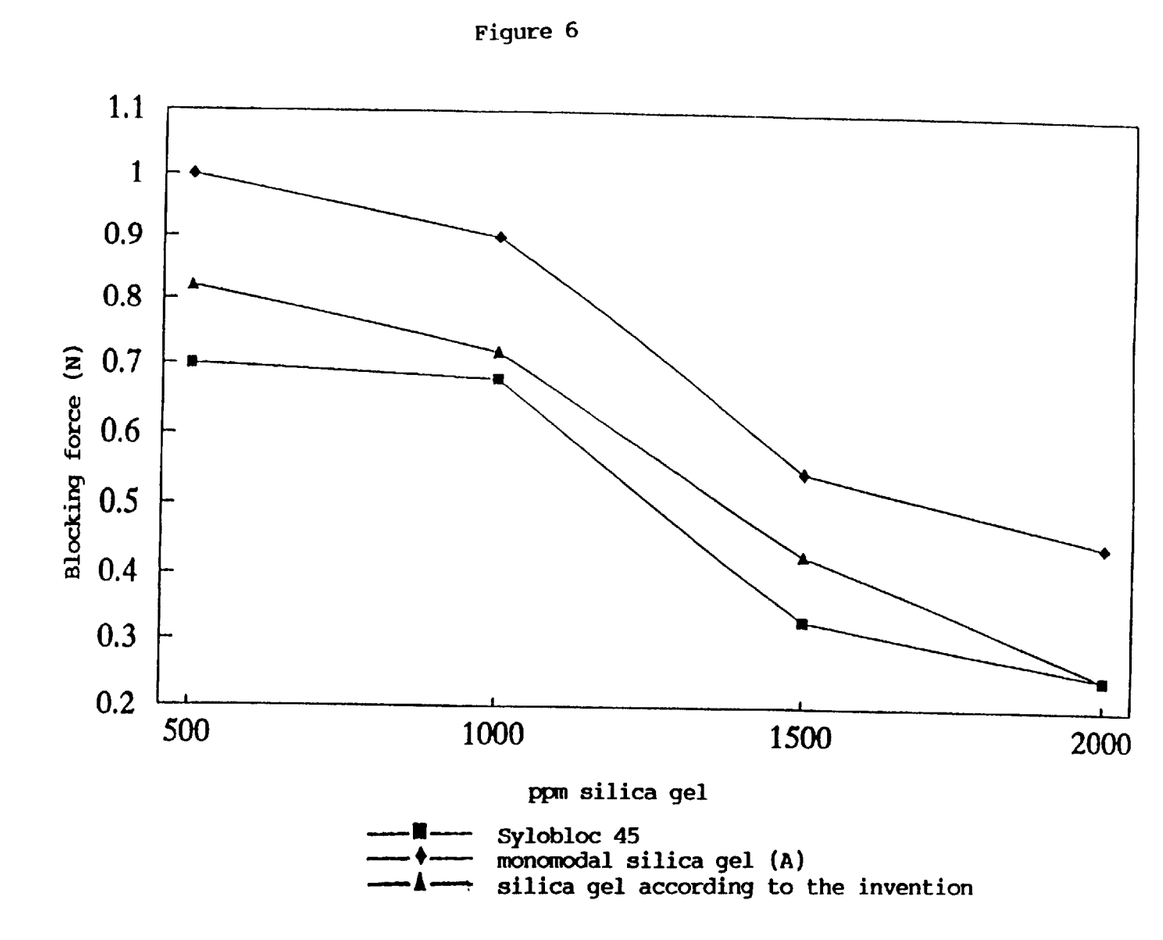
FIG. 6 is a comparison of blocking force vs. silica content for film containing the antiblocking agent of the invention and films containing prior art antiblocking agents.

It is evident from the results in FIG. 6 that the silica gel according to the invention according to Example 1 has almost the same anti-blocking effectiveness as a traditional SYLOBLOC 45 silica gel having a pore volume of 1.2 ml/g and monomodal pore size distribution, and a significantly improved anti-blocking effectiveness vis-à-vis a silica gel (A) having a pore volume of 0.7 ml and monomodal pore size distribution.

EXAMPLE 5

Figure 7:
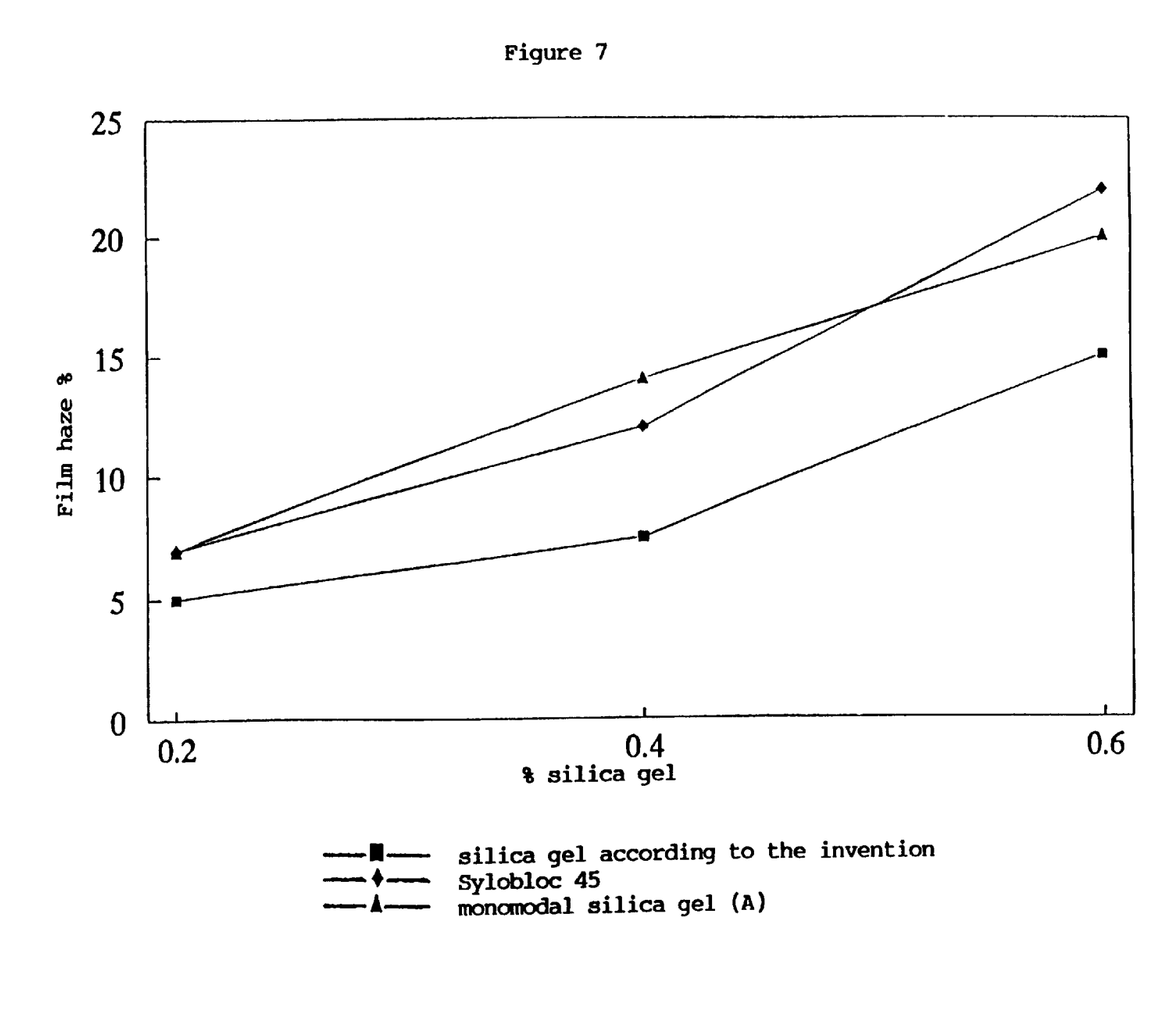
FIG. 7 is a comparison of film haze vs. silica content for film containing the antiblocking agent of the invention and films containing prior art antiblocking agents.

The haze at extruded flat polypropylene films having a thickness of 50 μm was measured according to ASTM D 1003. FIG. 7 shows that the silica gel according to the invention according to Example 1 produced considerably less film haze than the standard SYLOBLOC 45 silica gel and a silica gel (A) having the same pore volume but a monomodal pore size distribution.

What is claimed is:

1. Antiblocking agent comprising silicon dioxide or mixtures of silicon dioxide and zeolite, wherein said antiblocking agent has a bimodal pore size distribution in which a first maximum lies in the pore size range <5 nm and a second maximum lies in the pore size range >6 nm.

2. Anti-blocking agent according to claim 1 which consists of a mixture of 2 anti-blocking agents having different pore volumes in the weight ratio of 8:2 to 2:8.

3. Anti-blocking agent according to claim 2 in which the two anti-blocking agents consist of amorphous silica gels, one of which has a pore volume of 0.9 to 1.9 ml/g and a surface of 250 to 500 m$^2$/g and therefore an average pore diameter of 7.2 to 30.4 nm, and the other a pore volume of 0.3 to 0.6 ml/g and a surface of 500 to 900 m$^2$/g and therefore an average pore diameter of 1.3 to 4.8 nm.

4. Process for the manufacture of an anti-blocking agent according to claim 1, characterized in that a mixture of silicon dioxide of a certain pore size and silicon dioxide and/or zeolite with a different pore size is micronized.

5. Process according to claim 4, characterized in that a jet mill is used for micronizing to a particle size of 1 to 10 μm.

6. A polymer film comprising a polymer resin and an antiblocking agent wherein said antiblocking agent contains silicon dioxide or mixtures of silicon dioxide and zeolite, and said antiblocking agent has a bimodal pore size distribution in which a first maximum lies in the pore size range <5 nm and a second maximum lies in the pore size range >6 nm.

7. The polymer film of claim 6 wherein said composition further comprises a lubricating agent.

8. The polymer film of claim 7 wherein said lubricating agent is selected from the group consisting of amides of $C_8$–$C_{22}$ fatty acids or mixtures thereof.

9. The polymer film of claim 6 wherein said film contains about 20–80 wt. % of said lubricating agent based on the combined weight of said lubricating agent and said antiblocking agent.

10. The polymer film of claim 6 wherein said antiblocking agent comprises (i) a silica gel having a pore volume of about 0.9 to 1.9 ml/g and a surface area of about 250 to 55 $m^2/g$ and therefore an average pore diameter of about 7.2 to 30.4 nm, and (ii) a silica gel having a pore volume of about 0.3 to 0.6 ml/g and a surface area of about 500 to 900 $m^2/g$ and therefore an average pore diameter of about 1.3 to 4.8 nm.

11. A polymer masterbatch composition comprising polymer resin and about 10 to 50 wt. % total of antiblocking agent and lubricant wherein said antiblocking agent comprises silicon dioxide or mixtures of silicon dioxide and zeolite, and said antiblocking agent has a bimodal pore size distribution in which a first maximum lies in the pore size range <5 nm and a second maximum lies in the pore size range >6 nm.

12. The polymer masterbatch composition of claim 11 wherein said composition contains about 20–80 wt. % of said lubricating agent based on the combined weight of said lubricating agent and said antiblocking agent.

13. The polymer masterbatch composition of claim 11 wherein said antiblocking agent comprises (i) a silica gel having a pore volume of about 0.9 to 1.9 ml/g and a surface area of about 250 to 500 $m^2/g$ and therefore an average pore diameter of about 7.2 to 30.4 nm, and (ii) a silica gel having a pore volume of about 0.3 to 0.6 ml/g and a surface area of about 500 to 900 $m^2/g$ and therefore an average pore diameter of about 1.3 to 4.8 nm.

* * * * *